United States Patent
Kashyap (10) Patent No.: US 7,103,757 B1
(45) Date of Patent: Sep. 5, 2006

(54) SYSTEM, CIRCUIT, AND METHOD FOR ADJUSTING THE PREFETCH INSTRUCTION RATE OF A PREFETCH UNIT

(75) Inventor: Asheesh Kashyap, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 464 days.

(21) Appl. No.: 10/277,339

(22) Filed: Oct. 22, 2002

(51) Int. Cl.
*G06F 9/00* (2006.01)
(52) U.S. Cl. .................. 712/237; 712/207; 712/239
(58) Field of Classification Search ............. 712/207, 712/237, 239, 240
See application file for complete search history.

(56) References Cited

U.S. PATENT DOCUMENTS

| | | | | |
|---|---|---|---|---|
| 5,701,448 A | * | 12/1997 | White | 712/233 |
| 5,719,800 A | * | 2/1998 | Mittal et al. | 713/321 |
| 5,838,945 A | * | 11/1998 | Emberson | 712/200 |
| 5,860,017 A | * | 1/1999 | Sharangpani et al. | 712/23 |
| 5,951,678 A | * | 9/1999 | Moyer | 712/237 |
| 6,029,228 A | * | 2/2000 | Cai et al. | 711/137 |
| 6,055,650 A | * | 4/2000 | Christie | 714/39 |
| 6,275,927 B1 | | 8/2001 | Roberts | |
| 6,460,116 B1 | | 10/2002 | Mahalingaiah | |
| 6,571,318 B1 | * | 5/2003 | Sander et al. | 711/137 |
| 6,792,524 B1 | * | 9/2004 | Peterson et al. | 712/235 |

OTHER PUBLICATIONS

The Authoritative Dictionary of IEEE Standards Terms, 7th Ed. Standards Information Network, IEEE Press, 2000.*

* cited by examiner

*Primary Examiner*—Eddie Chan
*Assistant Examiner*—Kevin P. Rizzuto
(74) *Attorney, Agent, or Firm*—Daffer McDaniel, LLP (57) ABSTRACT

A system, circuit, and method are presented for adjusting a prefetch rate of a prefetch unit from a first rate to a second rate by determining a probability factor associated with a branch instruction. The circuit and method may determine the probability factor based on a type of disparity associated with the branch instruction. The circuit and method may further be adapted to calculate the second rate based on the probability factor. The ability to adjust the prefetch rate of a prefetch unit advantageously decreases the number of memory transactions, thereby decreasing the power consumption of a processing unit.

20 Claims, 5 Drawing Sheets

SYSTEM, CIRCUIT, AND METHOD FOR ADJUSTING THE PREFETCH INSTRUCTION RATE OF A PREFETCH UNIT

BACKGROUND OF THE INVENTION

1. Field of the Invention

This invention relates to microprocessor design, and more particularly to a system, a circuit, and a method for adjusting prefetching rates by determining a probability factor for a type of branch instruction when the branch instruction is encountered in a set of instructions.

2. Description of the Related Art

The following descriptions and examples are not admitted to be prior art by virtue of their inclusion within this section.

Over the years, the use of microprocessors has become increasingly widespread in a variety of applications. Today, microprocessors may be found not only in computers, but also in a vast array of other products such as VCR's, microwave ovens, and automobiles. In some applications, such as microwave ovens, low cost may be the driving factor in the implementation of the microprocessor. On the other hand, other applications may demand the highest performance obtainable. For example, modern telecommunication systems may require very high speed processing of multiple signals representing voice, video, data, etc. Processing of these signals, which have been densely combined to maximize the use of available communication channels, may be rather complex and time consuming. With an increase in consumer demand for wireless communication devices, such real time signal processing requires not only high performance but also demands low cost. To meet the demands of emerging technologies, designers must constantly strive to increase microprocessor performance while maximizing efficiency and minimizing cost.

With respect to performance, greater overall microprocessor speed may be achieved by improving the speed of devices within the microprocessor's circuits as well as architectural development that allow for optimal microprocessor performance and operations. As stated above, microprocessor speed may be extremely important in a variety of applications. As such, designers have evolved a number of speed enhancing techniques and architectural features. Among these techniques and features may be the instruction pipeline, the use of a branch prediction scheme, and the concept of prefetching.

A pipeline consists of a sequence of stages through which instructions pass as they are executed. In a typical microprocessor, each instruction comprises an operator and one or more operands. Thus, execution of an instruction is actually a process requiring a plurality of steps. In a pipelined microprocessor, partial processing of an instruction may be performed at each stage of the pipeline. Likewise, partial processing may be performed concurrently on multiple instructions in all stages of the pipeline. In this manner, instructions advance through the pipeline in assembly line fashion to emerge from the pipeline at a rate of one instruction every clock cycle.

The advantage of the pipeline generally lies in performing each of the steps required in a simultaneous manner. To operate efficiently, however, a pipeline must remain full. For example, the pipeline scheme tends to work best on linear code, where instructions are consecutively fetched and processed. However, if the flow of instructions in a pipeline is disrupted, clock cycles may be wasted while the instructions within the pipeline are prevented from proceeding to the next processing step. In particular, most programs executed by a processor contain at least one non-linear code sequence. Such sequences may include instructions, such as branches, that may cause the processing of instructions (i.e., the program flow) to flow out-of-order and slow down the pipeline. Therefore, it would be advantageous to devise a scheme in which to overcome the effects of executing non-linear code sequences (such as branch instructions) within a pipeline.

Branch instructions may be classified into several different types. A "branch instruction," as described herein, is an instruction that typically diverts program flow from a current instruction to a target address within or outside of the current instruction set. A first type of classification is the direction in which the program flow is diverted by the branch instruction. If program flow is diverted to a target address, which is greater than a source address containing the branch instruction, the branch instruction may be referred to as a "forward branch instruction." Conversely, if the target address is less than the source address, the branch instruction may be referred to as a "backward branch instruction."

A second type of classification is whether a target address is provided along with the branch instruction. In the case of an unconditional branch instruction, the target address is provided and there is no ambiguity as to where the microprocessor should go to fetch the next set of instructions (pointed to by the target address). As such, unconditional branch instructions do not impede performance, since the microprocessor may continue to read instructions from the target address and process the instructions within the pipeline. In some cases, the unconditional branch may be further classified by determining the direction in which program flow is diverted by the branch instruction.

In the case of a conditional branch instruction, however, the target address is not provided and needs to be generated. Unfortunately, the generation of a target address may result in a time penalty, as the generation may stall the pipeline and not allow for other instructions to be processed. Such a time penalty may hinder the performance of the pipeline, and consequentially, the overall performance of the microprocessor.

In an effort to avoid the time penalties associated with conditional branch instructions, a branch prediction scheme may be used to determine the most likely target address. If the prediction is accurate, the microprocessor proceeds at full speed and no performance penalties are assessed. However, if the prediction is inaccurate, the microprocessor must cancel the instructions being executed and take another branch to find the right target address. The process of predicting a target address may result in unnecessary execution of instructions, which the microprocessor may not need; therefore, resulting in an increase of power consumption and a decrease in microprocessor performance. Therefore, a need remains for a more complex prediction scheme.

One example of a more complex prediction scheme is to determine the target address dynamically. For example, a microprocessor can maintain a history table, implemented in hardware, that records the results of previous conditional branch instructions. The results of the previous conditional branch instructions (i.e. the target address) may help the microprocessor to predict the outcome of a conditional branch instruction encountered within a set of instructions. In the dynamic branch prediction scheme, the working assumption is that similar branch instructions may have the same target address. However, one disadvantage of the dynamic branch prediction scheme is that it requires specialized and expensive hardware.

Figure 1:
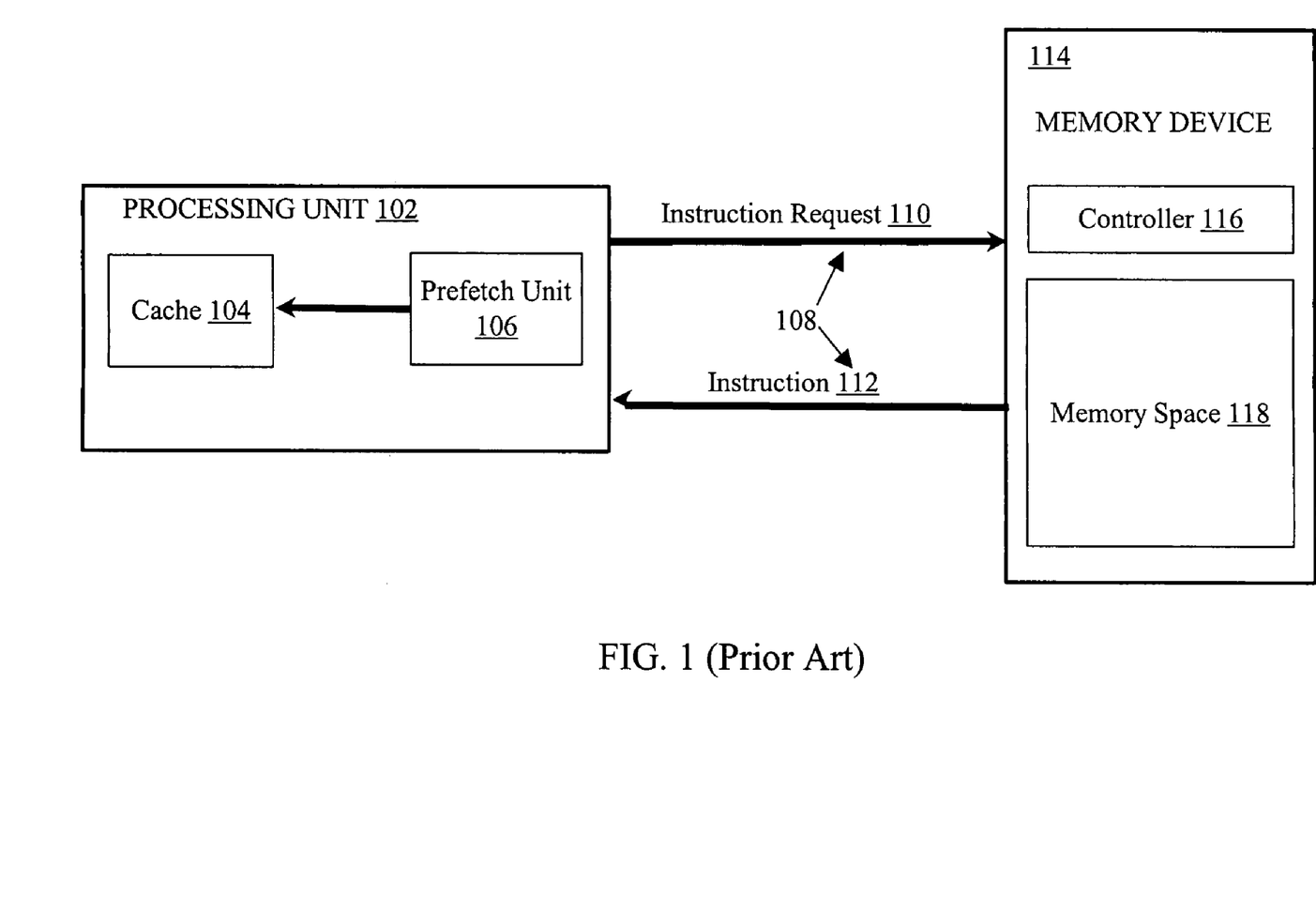
FIG. 1 is a block diagram illustrating portions of a typical computer system.

Another advancement in microprocessor technology relates to the concept of prefetching information, where such information may either be data or instructions. FIG. 1, for example, illustrates one embodiment of the prefetch concept. As illustrated in FIG. 1, prefetch unit 106 may request a block of information by transmitting one or more instruction addresses 110, via memory bus 108, to memory controller 116 of memory device 114. In some cases, memory device 114 may be an external memory device having a relatively high order in the memory hierarchy. Memory controller 116 may retrieve the block of information from memory space 118 and may transmit retrieved instructions 112, via memory bus 108, to processing unit 102. A "processing unit," as described herein, is typically a microprocessor, but may alternatively encompass any circuitry adapted to execute instructions. Subsequently, instructions 112 may be written to a storage device lower in the memory hierarchy, such as a lower order level of cache memory device 104. Prefetching may allow the time spent retrieving the block of information to occur concurrently with other actions of processing unit 102. Thus, when the processing unit 102 requests the prefetched information, there may be little or no delay in having to fetch the information from a nearby cache.

As such, prefetching involves a speculative retrieval of information, where the information may be retrieved from a higher-level memory system, such as external memory device 114, and placed into a lower level memory system, such as cache memory device 104. Such a retrieval may be executed under the expectation that the retrieved information may be needed by the processing unit for an anticipated event at some point after the next successive clock cycle.

In some cases, processing unit 102 may include an internal, or on-chip, cache memory device 104, as illustrated in FIG. 1. An internal cache, often called a primary cache, may be built into the circuitry of the processing unit. Processing unit 102 may further include internal prefetch unit 106, which may be coupled to the internal cache memory device via an internal bus. In other cases, however, cache memory device 104 and prefetch unit 106 may be external devices coupled to processing unit 102 via an external bus (not shown). The advantages and disadvantages of including internal versus external devices are well known in the art; thus, only internal devices are illustrated in FIG. 1 for the purpose of simplicity.

Several types of prefetching are known in the art. The most common example of a prefetch may be performed in response to a load operation. A load may occur when the processing unit requests specific information to be retrieved, so that the processing unit may use the retrieved information. In another example, a store operation may prefetch a block of data, so that a portion of the block may be overwritten with current information.

Another form of prefetching may occur for certain instructions, such as a branch instruction. For example, branch instructions may involve a prefetch unit to stop fetching instructions sequentially, and to divert fetching to the instructions within a target address associated with the branch instruction. As noted above, the branch instructions may be unconditional (i.e., where a target address is provided) or conditional (i.e., where a target address is not provided). In either case, the processing unit may need the instructions associated with the target address before the processing unit may continue to fetch the remaining set of instructions sequentially. Therefore, a prefetch operation may be performed so that the instructions of the target address are more readily accessible for processing after the branch instruction is fetched. By prefetching instructions during a time in which the processing unit is occupied with other processing, the speed of the processing unit may be increased by ensuring the availability of subsequent instructions before the processing unit requests the instructions.

Though prefetching, according to the manners described above, provides the benefit of improved microprocessor performance, the present inventor has recognized various drawbacks resulting from techniques, which attempt to use branch prediction and prefetching schemes in a pipelined system. The discussion of such drawbacks is presented below along with various embodiments that reduce the effects of such drawbacks and improve upon the prior art.

SUMMARY OF THE INVENTION

Instruction prefetching may improve processing unit performance by allowing blocks of information to be prefetched from a higher level of memory and stored in a lower level of memory, which may contain a more accessible, faster memory device (e.g., a cache memory device). As such, many computer systems may include various levels of a memory hierarchy, in which the lower level memory devices are often smaller and faster than the one or more previous levels. When the processing unit requests an instruction at a specific memory address, a block of instructions including the requested instruction may be fetched from a higher ordered memory device, such as a main memory device, a disk drive, etc. In most cases, the instructions in the block are taken from consecutive memory addresses and stored in a lower ordered memory device, such as a cache memory device. Such systems may advantageously reduce the number of main memory accesses, thereby improving the execution time and reducing the power consumption of the processing unit.

The rate at which instructions are prefetched is referred to as the "prefetch instruction rate," and may be generally described as the number of instructions prefetched from memory within a given time unit (e.g., one clock cycle). When a branch instruction is encountered in conventional prefetch schemes, the prefetch unit may prefetch a number of instructions related to the branch instruction from a higher order memory device, where prefetching is performed at a fixed rate. However, the number of prefetched instructions may not be used by the processing unit if the target address of the branch instruction is not accurately predicted.

For example, in the case of a conditional branch (i.e., a branch instruction in which the target address is not provided), the processing unit may use a branch prediction scheme to predict a first target address and begin prefetching the instructions associated with the first target address. Often the accuracy of the predicted target address is not known for a number of cycles after the first target address is fetched. If the target address is predicted incorrectly, the processing unit may not use the prefetched instructions related to the first target address. Instead, the processing unit may have to predict a second target address and begin prefetching the instructions associated with the second target address. As such, the branch prediction scheme may result in prefetching useless instructions, thereby increasing the power consumption of the processing unit.

To decrease power consumption and improve microprocessor performance, improved circuits, systems and methods are provided herein for adjusting a prefetch instruction rate. In some cases, the prefetch instruction rate may be adjusted by changing the prefetch instruction rate from a first rate to a second rate, where the second rate is typically slower than the first. For example, when a conditional branch instruction is encountered, instructions related to a target address may be prefetched at a second rate, which is slower than the first rate. Prefetching at a slower rate will allow fewer instructions to be fetched from memory in case the target address is incorrect. Therefore, adjusting the prefetch instruction rate may reduce the number of instructions not used by a processing unit, resulting in decreased power consumption.

In some cases, the second rate may be determined by the type of disparity associated with a branch instruction, and a probability factor associated with the type of disparity. In some cases, the "type of disparity" may include: (i) whether or not a target address is provided, (ii) the direction of the branch, and/or (iii) the size of the branch instruction (i.e., a difference between the branch instruction and the target address of the branch instruction). The "probability factor," as described herein, is the probability that the target address being prefetched is the correct address. If the target address is mis-predicted, the number of instructions prefetched at the second rate will be less than the number of instructions prefetched at the first rate. As such, adjusting the prefetch instruction rate may be an important factor in reducing the power consumption of the processing unit (by reducing the number of useless instructions prefetched).

In programs that are inundated with branch instructions, adjusting the prefetch instruction rate will ensure that, if the target address is mis-predicted, the number of useless instructions will be less than if the instructions were prefetched at a fixed prefetch instruction rate. As will be described in more detail below, adjusting the prefetch instruction rate improves the performance of the processing unit by reducing the number of instructions not being used in the pipeline and reducing the power consumption of the processor. Thus, a computer system, circuit, and method are contemplated herein for prefetching at a first rate, detecting a branch instruction, determining the type of branch instruction detected, determining a probability factor associated with the type of branch instruction, calculating a second rate, and adjusting the prefetch instruction rate from the first rate to the second rate (if necessary).

In one embodiment, a computer system is contemplated. The computer system may have a memory that stores a set of instructions having one or more branch instructions. In some cases, the computer system may include a prefetch unit coupled to the memory for fetching the set of instructions at a first rate. Furthermore, the computer system may also comprise a circuit, which is coupled between the memory and the prefetch unit for receiving the branch instruction(s) within the set of instructions. In some cases, the circuit may include a decoder for detecting the branch instruction(s) within the set of instructions. The decoder may be adapted to decode a field of bits within each instruction of the set of instructions.

In some cases, the circuit may be further adapted to determine a probability factor corresponding to a type of disparity (or disparities) associated with the branch instruction. For example, the circuit may be adapted to detect the type of disparity between the next instruction following the branch instruction and a number of instructions related to the branch instruction. In order to determine the probability factor, the circuit may comprise a history table relating the branch instruction to the type of disparity detected. As such, the probability factor may comprise a time between when the next instruction within the set of instructions is to be fetched and when the next instruction within the set of instruction is to be fetched after fetching all the number of instructions associated with the branch instruction. Furthermore, the circuit may be coupled to change the fetch rate of the prefetch unit from a first rate to a second rate.

A method for adjusting a prefetch rate is also contemplated. In some cases, the method may include receiving a set of instructions from a prefetch unit at a first rate, and detecting a branch instruction within the set of instructions. In some cases, the step of detecting a branch instruction within the set of instructions may include decoding a field of bits within each of the instructions within the instruction set. The method may also include detecting a type disparity (or disparities) associated with the branch instruction, wherein the type of disparity comprises a size of the branch instruction, a direction of the branch instruction, and/or whether or not a target address is provided with the branch instruction. The method may then use the type(s) of disparities detected to determine a probability factor.

In addition, the method may include selecting a mispredict band corresponding to the probability factor. The method may also include calculating a second value for prefetching, wherein the step of calculating a second value may include subtracting the mispredict band from a first value. As used herein, the first value may correspond to a first prefetch instruction rate and the second value may correspond to a second prefetch instruction rate, where the second rate is typically slower than the first. In some cases, the method may include adjusting the prefetch unit, so that the instructions corresponding to the target address are prefetched at the second rate, if the probability factor indicates that there is only a small likelihood that the target address is correct. In this manner, the current method may be used to decrease the number of memory requests and useless number of instructions retrieved (e.g., by 20% or more) which, in return, reduces the power consumption by roughly the same amount (e.g., about 20% as well).

A circuit is contemplated herein for receiving a set of instructions that are prefetched at an adjustable rate. In some cases, the circuit may include a probability selection unit for detecting a branch instruction, detecting one or more types of disparities associated with the branch instruction, and assigning a probability factor to the branch instruction based on the type(s) of disparities detected. As described in more detail below, the probability selection unit may be coupled to a rate adjusting unit for enabling or disabling a register that stores a first value. As such, the probability selection unit may include a means for generating control signals, which may be supplied to the rate adjusting unit for controlling the functionality of the register.

In some cases, the probability selection unit may detect a branch instruction by including branch detection circuitry for decoding a field of bits within each instruction of the set of instructions. In addition, the branch detection circuitry may further be used to determine the type of disparity (or disparities) associated with the branch instruction. In some cases, the probability selection unit may further include probability detection circuitry for determining a probability factor for the type of disparity (or disparities) associated with the branch instruction. The probability detection circuitry may be coupled to select a mispredict band that corresponds to the probability factor. For example, the probability selection unit may include a first multiplexer coupled for receiving the probability factor, and in response, selecting one of possibly several mispredict bands.

In addition to the probability selection unit, the circuit may include a prefetch rate adjustor for adjusting the prefetch instruction rate of a prefetch unit (e.g., from the first rate to a second rate) based on the probability factor. In some cases, the prefetch rate adjustor may include an arithmetic unit (e.g., a subtractor) for calculating a second value by subtracting the selected mispredict band received from the first multiplexer from a first value, wherein the first value corresponds to the first rate and the second value corresponds the second rate. The prefetch rate adjustor may also include a second multiplexer coupled between the arithmetic unit and the prefetch unit. In some cases, the prefetch rate adjustor may allow the prefetch instruction rate of the prefetch unit to remain at the first rate for a particular probability factor (e.g., a high probability factor). In other cases, the prefetch rate adjustor may reduce the prefetch rate of the prefetch unit to a second rate, slower than the first (e.g., for a lower probability factor). As such, the second multiplexer may be configured to select between the first rate and the second rate based on the probability factor provided by the probability selection unit.

In some cases, the prefetch rate adjustor may also include a register for storing the first and second values. As such, the register may store subsequent new values corresponding to subsequent new rates. The prefetch rate adjustor may also include a comparator unit coupled to the register for comparing the second value to a set of threshold values. The comparator may also be configured to adjust the prefetch rate (e.g., from the first rate to the second rate) based on the comparison with the threshold values. Thus, the circuit described may advantageously reduce the number of memory access, as well as the number of useless instructions introduced into the pipeline, as compared to implementations with fixed prefetch rates. In some cases, the overall performance of the processing unit may be improve by about 20% and the power consumption may be reduced by about 20% over traditional methods.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

As stated above, the concept of prefetching may involve a speculative retrieval of information. When a branch instruction is encountered, a prefetch unit may fetch a number of instructions from memory. In some cases, the processing unit may not use all of the instructions prefetched from memory (such as when a target address is mis-predicted for a conditional branch instruction). As described in more detail below, a need exists for improved systems and methods that may be used to decrease power consumption when a target address of a conditional branch instruction is mis-predicted.

Figure 2:
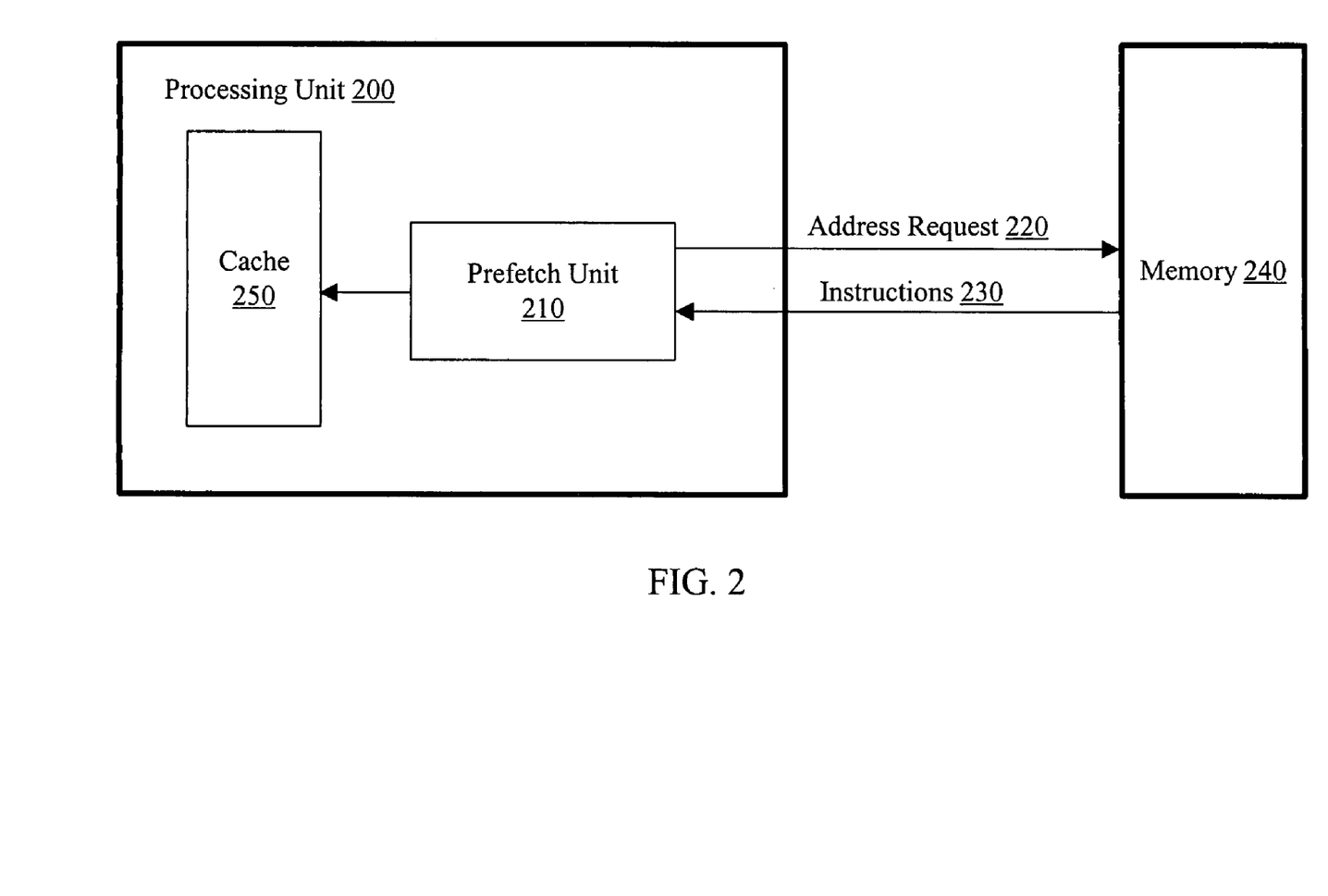
FIG. 2 is a block diagram illustrating one embodiment of a circuit for receiving a set of instructions containing a branch instruction.

FIG. 2 illustrates one embodiment of a circuit (i.e., processing unit 200) that may be used for prefetching at a fixed rate when a branch instruction is encountered. As shown in FIG. 2, processing unit 200 may generally include a prefetch unit 210 and a lower-level memory device, such as cache memory 250. The prefetch unit 210 shown in FIG. 2 is coupled to a higher-level memory device, such as external memory device 240, for sending an address request 220 (e.g., a target address) and receiving a set of instructions 230 in response thereto. The instructions 230 may then be stored within cache memory 250 for subsequent retrieval.

In some cases, the set of instructions 230 may be prefetched at a fixed rate. For example, if the target address of the branch instruction is known (e.g., in the case of an unconditional branch), prefetching may occur at a fixed rate due to the fact that the instructions associated with the target address are most likely needed by the processing unit. If the target address of the branch instruction is not known (e.g., in the case of a conditional branch instruction), a speculative retrieval of the target address takes place. For example, the processing unit may need to speculatively retrieve a target address for the conditional branch instruction and begin prefetching the set of instructions associated with the target address.

The process of predicting a target address is generally known as a branch prediction scheme. In conventional branch prediction schemes, a method is used to determine where the branch instruction diverges from the sequential program flow based on the type of branch instruction encountered and previous branch instruction results. Once a likely target address is predicted, the prefetch unit 210 prefetches the instructions associated with the target address from memory at a fixed rate.

The disadvantages associated with the branch prediction scheme mentioned above is that there is an obvious penalty for fetching instructions at a fixed rate. For example, assume that instructions related to a first target address determined by the branch prediction scheme are each fetched at the fixed rate. Because the branch prediction results cannot be verified until a number of cycles later, a large number of useless instructions (i.e., instructions not needed by the processing unit) may be fetched, if the branch prediction is inaccurate. In addition, if the first target address is wrong, the branch prediction method must be used again to predict a second target address. The method of branch prediction may be repeated until the actual target address is found. Therefore, the performance and power consumption of the processing unit is directly related to the number of useless instructions fetched by the prefetch unit, as well as the number of times the branch prediction must access memory to fetch each target address. The branch prediction scheme, therefore, becomes very critical to the overall performance of the processing unit.

Figure 3:
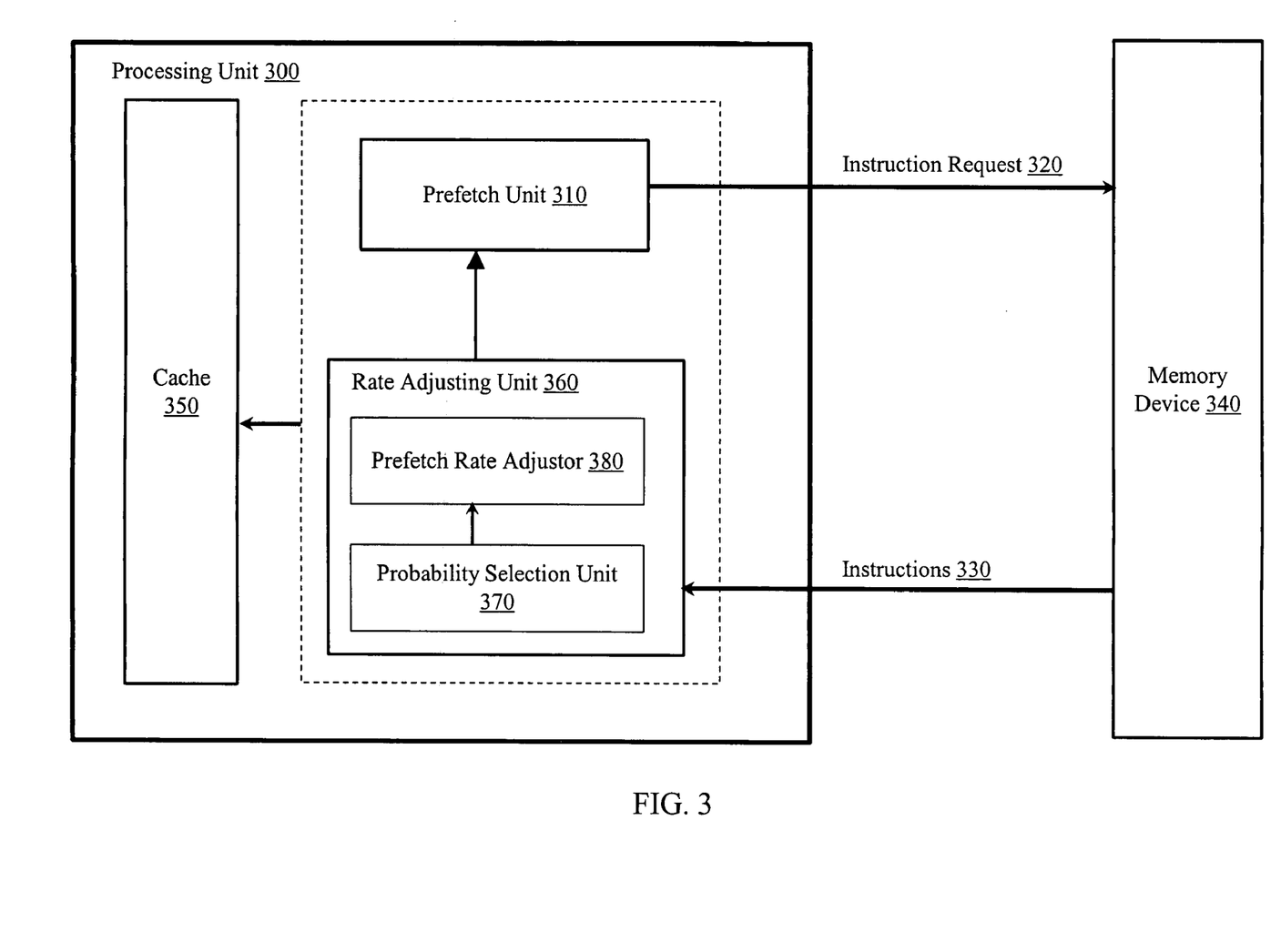
FIG. 3 is a block diagram illustrating portions of a computer system adapted for adjusting a prefetch rate, according to one embodiment of the invention.

FIG. 3 is provided herein as a preferred exemplarily embodiment of a computer system that may be used for adjusting a prefetch rate, e.g., from a first rate to a second rate. As shown in FIG. 3, processing unit 300 may include an internal prefetch unit 310, an internal rate adjusting unit 360 and a lower-level memory device, such as cache memory 350. Alternatively, prefetch unit 310 and/or rate adjusting unit 360 may be arranged external to processing unit 300 (which may be, e.g., a microprocessor). The advantages and disadvantages of internal versus external system components are well known in the art. Thus, prefetch unit 310 and rate adjusting unit 360 are illustrated in FIG. 3 as residing within processing unit 300 for the purpose of simplicity.

In one embodiment, rate adjusting unit 360 receives prefetched instructions 330 at a first rate from a higher-level memory device 340. The operation of prefetch unit 310 may be substantially identical to the operation of prefetch unit 106, as described above in reference to FIG. 1. In some cases, prefetched instructions 330 may include instructions that can be executed sequentially, such as those found in linear code sequences. However, such a case may not be practical in all applications. Therefore, prefetched instructions 330 may alternatively include branch instructions (e.g., conditional and/or unconditional branch instructions), in other cases. In this manner, rate adjusting unit 308 is preferably adapted for receiving a set of instructions from memory device 340, in which the set of instructions comprises at least one branch instruction.

In the embodiment of FIG. 3, rate adjusting unit 360 includes a probability selection unit 370 and a prefetch rate adjustor 380. When a set of instructions 330 is received from memory device 340, probability selection unit 370 may decode a field of bits within each instruction of the set of instructions to determine whether or not a branch instruction has been received. As will be described in more detail below, probability selection unit 370 may be further adapted to determine a probability factor of the branch instruction, where the probability factor is associated with a type of disparity between the branch instruction and the target address. Once the probability factor is determined, the prefetch rate adjustor 380 may be used to adjust the prefetch instruction rate from a first rate to a second rate. In some cases, the prefetch rate adjustor 380 may determine the second rate based on the probability factor provided by the probability section unit 370. In other words, the probability selection unit 370 may be coupled to determine the probability factor of the branch instruction based on the type of disparity of the branch instruction, and the prefetch rate adjustor 380 may be coupled to determine the second rate based on the probability factor.

Figure 4:
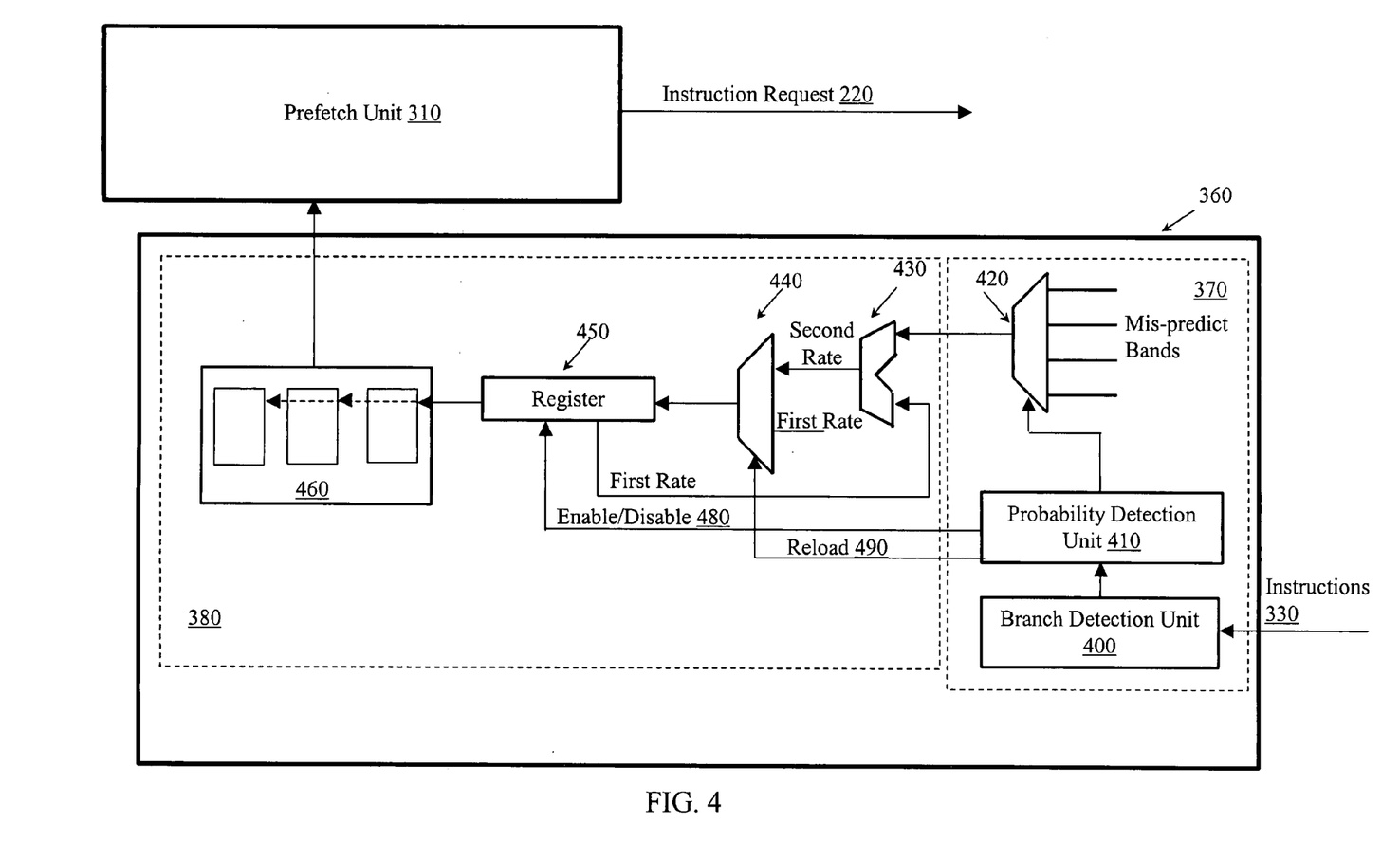
FIG. 4 is a block diagram illustrating one embodiment of a circuit that may be incorporated within the computer system of FIG. 3 for adjusting a prefetch rate.

The computer system described above for adjusting the prefetch rate, may now be discussed in greater detail below with references to FIG. 4. In particular, FIG. 4 is a "zoomed in" view of FIG. 3 illustrating various circuit components of the rate adjusting unit 360 and the interaction of such components with prefetch unit 310. Further details of probability selection unit 370 and prefetch rate adjustor 380 will now be described. As shown in FIG. 4, for example, probability selection unit 330 may include a branch detection unit 400, a probability detection unit 410 and a first multiplexer 420. As described in more detail below, the circuitry components within prefetch rate adjustor 380 may include arithmetic unit 430, second multiplexer 440, register 450, and compare unit 460.

As described above in reference to FIG. 3, rate adjusting unit 360 may be configured to receive a set of instructions 330 from a memory device (340) at a first rate. In some cases, the branch detection unit (400) within probability selection unit 370 may detect a branch instruction within an instruction field corresponding to one of the set of instructions. In some cases, branch detection unit 400 may utilize a decoder for decoding a field of bits within each instruction of the set of instructions to detect the branch instruction. In some cases, branch detection unit 400 may be further adapted to determine the type of disparity (e.g. a large-forward conditional branch instruction, a small-backward unconditional instructions, etc.) resulting from the branch instruction. For example, branch detection unit 400 may utilize a state machine to determine the type of disparity of the branch instruction. The type of disparity determined by the branch detection unit may then be supplied to probability detection unit 410.

Probability detection unit 410 may be used to determine a probability factor corresponding to the type of disparity detected by branch detection unit 400. As mentioned above, the probability factor is the probability that the target address being prefetched is correct. For example, one type of disparity may be whether or not the branch target address is provided, as mentioned above. If the target address of a branch instruction is provided, the probability detection unit 410 may issue a high probability factor, indicating that the instructions being prefetched (i.e., the instructions associated with the branch target address) will most likely be used by the processor. If a branch target address is not provided, the probability detection unit 410 may decrease the probability factor, indicating that some or all of the instructions being prefetched may not be used by the processor.

In some cases, the direction of the branch target address may be taken into consideration when determining the type of disparity and the corresponding probability factor. For example, the probability factor may be increased for a backward branch target address and decreased for a forward branch target address (where the designation of direction is another type of disparity). As mentioned above, a "forward branch instruction" is a branch instruction that diverts program flow to a branch target address, which is greater than the source address of the branch instruction. Conversely, a "backward branch instruction" is a branch instruction that diverts program flow to a target address, which is less than the source address. The probability factor of a backward branch target address is greater than that of a forward branch target address.

In a preferred embodiment, the type of disparity of a branch instruction may include a size classification, in addition to the direction and whether or not a target address is provided. For example, the "size" of a branch instruction may determine the distance (i.e., the number of instructions) between the branch instruction and the target address. As described herein, the "size" of a branch instruction may be small or large. For instance, a large distance between the branch instruction and target address may exist if the target address has not been prefetched and is still in memory. Conversely, a small distance may exist between the branch instruction and the target address if the target address is already in the set of instructions currently being fetched from memory, or if the target address is already stored in a cache memory. By further classifying the "size" of a branch instruction as yet another type of disparity, the probability factor of the instructions associated with the branch target will increase in accuracy, hence resulting in fewer memory accesses and thus, lowering the power consumption of the processing unit.

In some embodiments, probability detection unit 410 may determine the probability factor using a history table. However, unlike conventional implementations, the history table included within probability detection unit 410 may be configured to map a plurality of different types of disparities to a specific probability factor. Using such a history table, the probability factor associated with a type of branch instruction, including any combination of the above types of disparity, can be related to a mispredict band. The mispredict band, as described herein, is a range of bands that correlates the probability factor to each type of disparity. Hence, the probability detection unit 410 may be further adapted to map the probability factor to a particular mispredict band. For example, probability selection unit 370 may include a first multiplexer 420 that may be coupled to receive a probability factor from probability detection unit 410. Based on the probability factor received, first multiplexer 420 may be adapted to select a mispredict band from the range of bands, as illustrated in FIG. 4.

As shown in FIG. 4, probability detection unit 410 may be adapted to produce one or more control signals (e.g., enable/disable signal 480 and reload signal 490) relating to the probability factor. The control signals may be sent to prefetch rate adjustor 380 for enabling or disabling a particular prefetch instruction rate, as illustrated in FIG. 4 and described in more detail below.

In some cases, the probability factor may indicate that, due to the type of disparity associated with the branch instruction (e.g. a conditional branch instruction or a large-forward-target-provided unconditional branch instruction), the instructions associated with the target address will most likely not be found in cache memory. In other words, a low probability factor may indicate the likelihood of a cache miss. As described herein, a "cache miss" occurs when an instruction required by the processing unit is not available in the cache. If the probability factor is low, probability detection unit 410 may produce the appropriate control signals (e.g., enable/disable signal 480 and reload signal 490) to indicate that the prefetch rate should be maintained at the current rate (e.g., the first rate) to produce a new target address.

As shown in FIG. 4, rate adjusting unit 360 may also include a prefetch rate adjustor 380. In general, prefetch rate adjustor 380 may utilize the mispredict band provided by first multiplexer 420 to adjust the prefetch instruction rate from the first rate to a second rate. To adjust the prefetch rate, prefetch rate adjustor 380 may first be adapted to receive the mispredict band from the probability selection unit 370. Further details of prefetch rate adjust 380 will now be described with reference to FIG. 4.

As shown in FIG. 4, prefetch rate adjustor 380 may include arithmetic unit 430, second multiplexer 440, register 450, and compare unit 460 (which may comprise a plurality of comparators). In this configuration, arithmetic unit 430 is adapted to receive the mispredict band from first multiplexer 420 and a first value from register 450, corresponding to the first rate. In some cases, the arithmetic unit 430 may be a subtractor coupled to produce a second value, corresponding to the second rate, by subtracting the mispredict band from the first value.

As illustrated in FIG. 4, second multiplexer 440 may be adapted to receive the first value, the second value, and a reload signal 490 (i.e., a control signal from probability detection unit 410). In this manner, second multiplexer 440 may be adapted to select either the first value or the second value based the probability factor determined in the probability selection unit 370. The value selected by second multiplexer 440 may be supplied to register 450. In some cases, for example, register 450 may be adapted to receive the second value when the second value is selected by the second multiplexer. Register 450 is further adapted to receive an enable/disable signal (480) from probability selection unit 370 for controlling the value received from the second multiplexer. In some cases, enable/disable signal 480 may allow the prefetch unit to continue fetching at a current rate (i.e., a first rate, a second rate, etc).

Compare unit 460 comprises a plurality of comparators, where each of the plurality of comparators contains a threshold value. A "threshold value," as described herein, relates to a number of instructions the prefetch unit is adapted to fetch from memory over a given unit of time (e.g., one clock cycle). Compare unit 460 is adapted to receive a current prefetch rate (e.g., a first or second value) from register 450, as illustrated in FIG. 4. The current prefetch rate is compared to the threshold values within each of the plurality of comparators. If the current prefetch rate is equal to one of the threshold values, the corresponding comparator sets the prefetch unit to a second prefetch rate, where the second rate is substantially equivalent to the matching threshold value.

Figure 5:
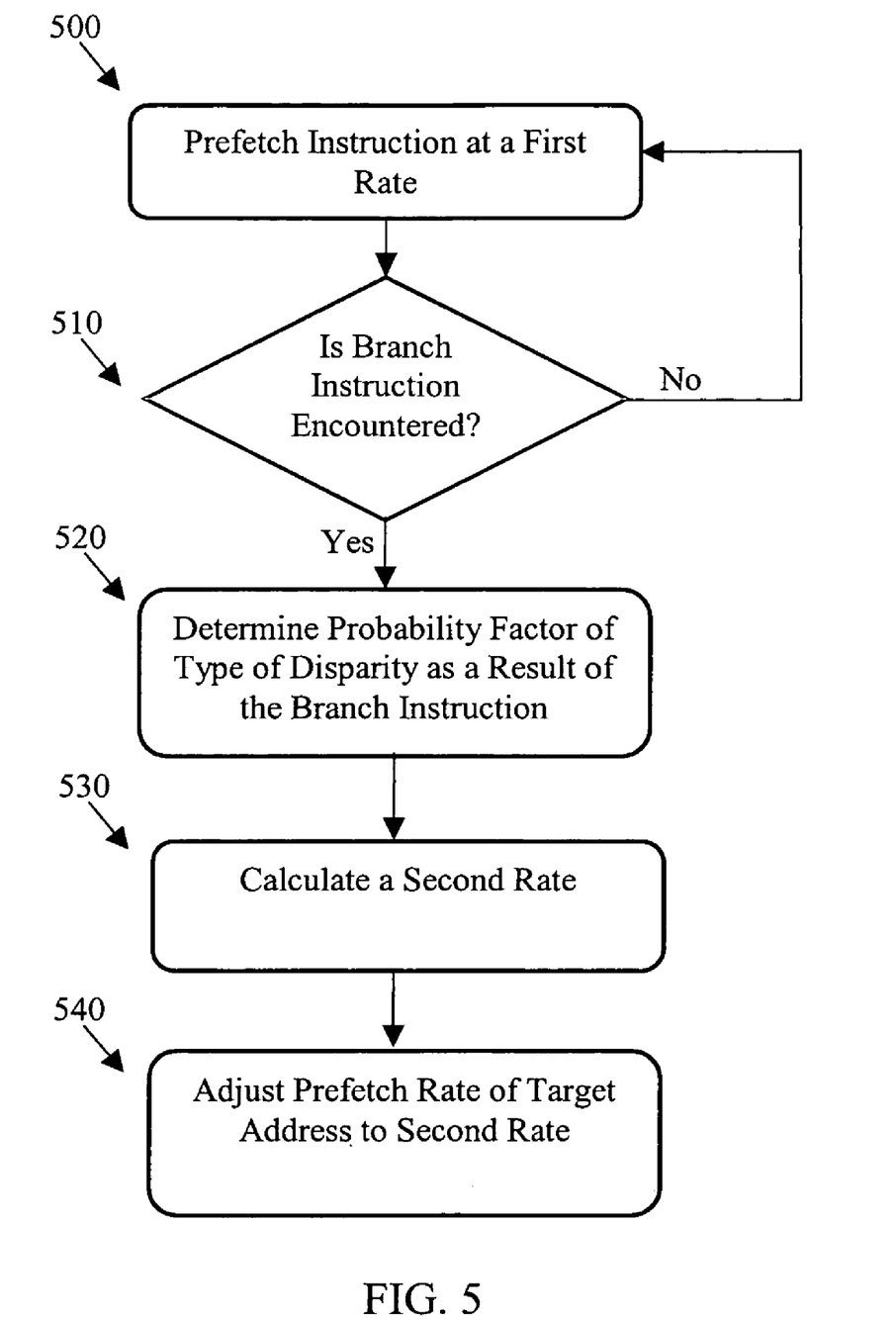
FIG. 5 is a flow chart illustrating one embodiment of a method for adjusting a prefetch rate.

FIG. 5 illustrates one embodiment of a method that may be used for adjusting a prefetch rate from a first rate to a second rate. Rate adjusting unit 360, as described above in FIG. 4, may receive a set of instructions at a first rate (step 500), as shown in FIG. 5. If a branch instruction is encountered (step 510), a probability factor is determined for the type(s) of disparity corresponding to the branch instruction (step 520). In some cases, the type of disparity may be mapped to a probability factor by using a history table. However, if a branch instruction is not encountered (step 510), rate adjusting unit 360 may continue to receive a next set of instructions at the same rate (i.e., a first rate).

Next, the method may include calculating a second rate (step 530) based on the probability determined in step 520. For example, the probability selection unit 370 of FIG. 4 may be used to select a mispredict band corresponding to a particular probability factor. The rate adjusting unit 380 may use the mispredict band along with a first value (corresponding to the first rate) to determine a second value (corresponding to the second rate). In some cases, the method may include adjusting the prefetch rate from the first rate to the second rate (in step 540), if the mispredict band indicates that there is a low probability that the predicted target address is correct. For example, the second value may be compared against a set of threshold values, where each threshold value corresponds to a different prefetch rate.

Therefore, the computer system, circuit and method described above may advantageously improve the performance of a processing unit with respect to power consumption by adjusting the prefetch rate from a first rate to a second rate when cache misses are likely to occur (i.e., when the probability of a mis-predicted target address is high). Such adjustments allow fewer main memory transactions to occur and fewer useless instructions (i.e., instructions that are not needed by the processor) to be introduced into the pipeline. In some cases, such an advancement may result in a 20% overall improvement of the processing unit, as well as a 20% decrease in power consumption.

It will be appreciated to those skilled in the art having the benefit of this disclosure that the computer system, circuit and method described herein are believed to provide a method for adjusting a prefetch rate of a prefetch unit from a first rate to a second rate. Such a computer system, circuit and method advantageously provides a decrease in memory transactions, thus decreasing the overall power consumption of the processing unit. Further modifications and alternative embodiments of various aspects of the invention will be apparent to those skilled in the art in view of this description. Therefore, it is intended that the following claims be interpreted to embrace all such modifications and changes and, accordingly, the specification and drawings are to be regarded in an illustrative rather than a restrictive sense.

What is claimed is:

1. A computer system, comprising:
a memory comprising a set of sequential instructions having a branch instruction, the branch instruction configured to conditionally or unconditionally redirect program flow to a target code sequence;
a prefetch unit coupled to fetch the set of sequential instructions from the memory at a first rate;
a circuit coupled between the memory and the prefetch unit for receiving the branch instruction along with the set of sequential instructions, wherein the circuit is adapted to reduce a rate at which instructions within the target code sequence are fetched from the memory, if a probability factor associated with the branch instruction indicates that it is unlikely that program flow will be redirected to the target code sequence, wherein if the rate is reduced, the rate is reduced from the first rate to a second rate, which is greater than zero, and wherein the circuit comprises:
a first multiplexer configured to select a mispredict band corresponding to the probability factor; and,
an arithmetic unit configured to calculate the second rate by subtracting the selected mispredict band from a first value corresponding to the first rate.

2. The computer system as recited in claim 1, wherein the first rate is greater than the second rate by at least 20%.

3. The computer system as recited in claim 1, wherein the probability factor is based on a size of the branch instruction, wherein the size of the branch instruction is equivalent to a number or sequential instructions existing between the branch instruction and a first instruction of the target code sequence.

4. The computer system as recited in claim 3, wherein the probability factor is further based on whether or not a target address associated with the target code sequence is provided along with the branch instruction.

5. The computer system as recited in claim 4, wherein the probability factor is further based on a direction of the branch instruction, wherein the direction is "forward" if the target address is greater than a source address of the branch instruction and "backward" if the target address is less than the source address.

6. A circuit configured to receive a set of sequential instructions prefetched from memory at a first rate, the circuit comprising:
a probability selection unit configured to detect a branch instruction within the set of sequential instructions, determine at least one type of disparity associated with the branch instruction, and determine a probability factor for the branch instruction based on the at least one type of disparity; and wherein the probability, selection unit comprises:
a first multiplexer configured to select a mispredict band corresponding to the probability factor; and
a prefetch rate adjustor coupled to a prefetch unit for adjusting a rate at which the prefetch unit prefetches instructions within a target code sequence associated with the branch instruction, wherein the rate is reduced from the first rate to a second rate, which is less than the first rate but greater than zero, if the determined probability factor indicates that it is unlikely that program flow will be redirected to the target code sequence, and wherein the prefetch rate adjustor comprises:
a register configured for storing a first value representative of the first rate; and
an arithmetic unit configured to calculate a second value by subtracting the mispredict band selected by the first multiplexer from the first value stored within the register, wherein the second value corresponds to the second rate.

7. The circuit as recited in claim 6, wherein the probability selection unit further comprises branch detection circuitry configured to detect the branch instruction by decoding a field of bits within each instruction of the set of sequential instructions.

8. The circuit as recited in claim 7, wherein the branch detection circuitry is further configured to determine the at least one type of disparity associated with the branch instruction, wherein the at least one type of disparity is selected from a group comprising a size of the branch instruction, a direction of the branch instruction, and whether or not a target address is provided along with the branch instruction.

9. The circuit as recited in claim 6, wherein the prefetch rate adjuster further comprises a second multiplexer configured to select either the second value or the first value, depending on the probability factor.

10. The circuit as recited in claim 6, wherein the register is further configured for storing the second value.

11. The circuit as recited in claim 6, wherein the prefetch rate adjustor further comprises a comparator configured to compare the second value to a set of threshold values, and wherein the comparator is further adapted to adjust the first rate to the second rate if the second value exceeds at least one of the threshold values.

12. The circuit as recited in claim 6, wherein the circuit is configured to:
maintain a prefetch instruction rate of the prefetch unit at the first rate, if the probability factor indicates that it is likely that program flow will be redirected to the target code sequence; and
change the prefetch instruction rate of the prefetch unit to the second rate, if the probability factor indicates that it is unlikely that program flow will be redirected to the target code sequence.

13. The circuit as recited in claim 8, wherein the probability selection unit further comprises a history table configured for associating a plurality of probability factors to various combinations of disparities.

14. The circuit as recited in claim 13, wherein the probability selection unit uses the history table to select a particular probability factor based on multiple disparities associated with the branch instruction.

15. The circuit as recited in claim 14, wherein the probability selection unit is further configured for generating one or more control signals based on the selected probability factor, and wherein the one or more control signals are supplied to the prefetch rate adjustor for enabling/disabling a prefetch instruction rate of the prefetch unit.

16. The computer system as recited in claim 1, wherein the circuit further comprises a register configured for storing a first value representative of the first rate, and wherein the register is coupled to the arithmetic unit for supplying the first value thereto.

17. The computer system as recited in claim 16, wherein the circuit further comprises a second multiplexer configured for selecting either the second rate or the first rate based on the probability factor.

18. The computer system as recited in claim 17, wherein the register is further configured for storing a second value corresponding to the second rate, if the second rate is selected by the second multiplexer.

19. The computer system as recited in claim 18, wherein the circuit further comprises a comparator configured for comparing the second value to a set of threshold values, and for adjusting the first rate to the second rate if the second value exceeds at least one of the threshold values.

20. The computer system as recited in claim 19, wherein the circuit is configured to:

maintain a prefetch instruction rate of the prefetch unit at the first rate, if the probability factor indicates that it is likely that program flow will be redirected to the target code sequence; and change the prefetch instruction rate of the prefetch unit to the second rate, if the probability factor indicates that it is unlikely that program flow will be redirected to the target code sequence.

\* \* \* \* \*